US007008492B2

(12) United States Patent
Lisec

(10) Patent No.: US 7,008,492 B2
(45) Date of Patent: Mar. 7, 2006

(54) METHOD AND APPARATUS FOR THE MECHANICAL APPLICATION OF A SPACER STRIP ONTO A GLASS PANE

(76) Inventor: Peter Lisec, Bahnhofstr. 34, 3363 Hausmening-Amstetten (AT)

( * ) Notice: Subject to any disclaimer, the term of this patent is extended or adjusted under 35 U.S.C. 154(b) by 400 days.

(21) Appl. No.: 10/390,754

(22) Filed: Mar. 19, 2003

(65) Prior Publication Data

US 2003/0178127 A1 Sep. 25, 2003

Related U.S. Application Data

(63) Continuation of application No. PCT/IB04/002206, filed on Jul. 1, 2004.

(30) Foreign Application Priority Data

Mar. 20, 2002 (DE) ................................ 102 12 359

(51) Int. Cl.
*B32B 31/00* (2006.01)

(52) U.S. Cl. ......................... 156/64; 156/107; 156/109

(58) Field of Classification Search .................. 156/64, 156/107, 109, 199, 200–201, 212, 446, 447, 156/459, 468, 475, 477.1, 486, 543, 556
See application file for complete search history.

(56) References Cited

U.S. PATENT DOCUMENTS 4,561,929 A 12/1985 Lenhardt
4,769,105 A 9/1988 Lisec
5,888,341 A * 3/1999 Lafond ........................ 156/468

* cited by examiner

*Primary Examiner*—Jessica Rossi
(74) *Attorney, Agent, or Firm*—Edell, Shapiro & Finnan, LLC

(57) ABSTRACT

A method for the dimensionally accurate application of an elastoplastic spacer strip onto a glass pane intended for producing an insulating glass unit is that the spacer strip is not withdrawn from the storage drum but instead it is unwound in a manner free from any tensile stress and that the same is kept free from tensile and shearing stresses on the further route up to the pressing onto the glass pane, this being despite the fact that the application speed will inevitably fluctuate several times between zero, and a maximum value while edges of the glass pane are covered mechanically. The apparatus for performing the method therefore comprises a compensating or tailback section (3) between a first adjustably driven pair of rollers (1) and a second adjustably driven pair of rollers (9) as well as a sensor for recognizing the position of the strip in the compensating section.

6 Claims, 4 Drawing Sheets

METHOD AND APPARATUS FOR THE MECHANICAL APPLICATION OF A SPACER STRIP ONTO A GLASS PANE

CROSS REFERENCE TO RELATED APPLICATIONS

This application is a continuation of PCT/IB2004/002206, filed Jul. 1, 2004, and titled "Process and Device for Producing an Insulating Glass Pane," which claims priority to German Application No. DE 102 12 359.4, filed on Mar. 20, 2002, and titled "A Method and Apparatus for the Mechanical Application of a Spacer Strip onto a Glass Pane".

FIELD OF THE INVENTION

The invention relates to a method and an apparatus for the mechanical application of an elastoplastic strip as a spacer onto a glass pane which is intended for assembly with at least one further glass pane into an insulating glass unit.

BACKGROUND

Usually, spacers of an insulating glass unit comprising two or more glass panes consist of hollow aluminum or steel profiles.

From DE-A-30 02 904 a spacer in form of a strip of a rectangular cross section is known, which strip is already often known as a "swiggle strip" and, provided with protective films, comes from a storage drum or hasp and is applied onto the glass pane by means of an apparatus equipped with a turning head. Said strip-like spacer on the basis of butyl caoutchouc is viscoplastic, strongly adhesive (which is desirable for achieving a gas-tight connection at first between the first and later the second glass pane of the insulating glass unit) and has a strongly temperature-dependent viscosity.

Recently, substantially less temperature-sensitive elastoplastic spacer strips, presumably on the basis of polyurethane, have been developed which also show a rectangular cross section, are substantially more stable with respect to shape and dimension than the so-called "swiggle strip", comprise on the later outside a lamination made of aluminum foil and are provided only on the two narrow sides intended for the gluing with the glass panes with a thin adhesive and sealing layer which is covered until the application with protective foils.

Up until now these elastoplastic spacer strips were placed by hand on the first glass pane and, if necessary, corner miters were punched out. In the case of a mechanical application with an apparatus of the kind known from DE A 37 26 274 for example it has been noticed that the corners of the spacer will break in or are pressed outwardly towards the edge of the glass pane. It may also occur that the location of the joint between the start and end of the strip will open or the long straight section may go wavy. The cause of these problems is seen by the fact that the spacer strip is not applied at a constant speed. Rather, the application starts at speed zero, reaches a maximum value, is equal zero in the first corner again, rises again up to the next corner, etc. That is why it was presumed at first that the mentioned unsatisfactory work results were caused by the difficulties in synchronizing the movements of the numerous intermittently working drives of such an apparatus.

The invention is based on the object of providing a method and an apparatus which allow a clean, dimensionally-precise application of spacer strips.

This object is achieved with respect to the method by the invention by the following steps:

- Unwinding of the strip from a storage drum without any tensile stress and with at least a linear speed corresponding at least on the average to the application speed;
- Supplying the strip to the application point in a manner free from any tensile or shearing stress.

The invention is based on the finding that the quality defects observed when using respectively modified known apparatuses for applying plastic spacer strips are not caused by the electric control of the apparatus, i.e. the control unit of the machine, but instead by the material itself in conjunction with the manner of strip transport conventionally used in previously known apparatuses which exert a (albeit low) tension and/or thrust on the strip. While the thus produced low expansions and compressions were harmless because of the plasticity of the strip, it was noticed here that the elastoplastic spacer strip on the basis of polyurethane has a kind of shape memory, leading to the consequence that the strip which was expanded and/or compressed by the strip transport tries to assume its original length and its original cross section again. This resetting process can extend with decreasing speed over a period of several hours.

OBJECTS AND SUMMARY

Based on this finding, the central idea of the invention is to guide the strip from the storage drum to the application point free from tensile or shearing stresses, regardless of the often changing application speeds.

A preferred embodiment of the method is characterized in such a way that

- the strip, for the purpose of being delivered to the application point in a manner free from tensile and shearing stresses, is supplied by means of a first driven pair of rollers of a compensating section and, at the end of the same, is supplied to the application point by means of a second driven pair of rollers;
- the circumferential speed of the second pair of rollers is adjusted so as to be synchronous to the application speed, and
- the strip length in the compensating section between the first and the second pair of rollers is determined and, depending on the same, the circumferential speed of the first pair of rollers is adjusted.

It is assumed that the strip is not subjected to any expansions or compressions as a result of the active unwinding from the storage drum and the subsequent, low-friction guidance up to the first pair of driven rollers. The second pair of rollers is preferably situated close to the application point. In the compensating section between the first and the second pair of rollers no outside forces act upon the strip, apart from gravity. The compensating section, which is usually guided in an arc, acts as a buffer for supplies that are slightly in excess or too low by the first pair of rollers in relationship to the speed with which the second pair of rollers supplies the strip to the application point. In the case of an excess delivery the strip yields laterally in the compensating section, transversally to its running direction, and thus describes a larger arc. In the case of an inadequate delivery, the length will decrease and the arc will decrease accordingly which the strip describes in the compensating section. Notice must be taken that the strip speed is not constant during the application, but usually changes at least four times between zero and a maximum value (in the case of a rectangular glass pane). The slight differences in synchronous movement which may occur, among other things, by the different slip of the strip relative to the first and second pair of rollers are compensated by the change in the position of the strip which is guided to some extent in a slack fashion through the compensating section. At the same time, the length of the strip in the compensating section is monitored. In the case that the predetermined (average) setpoint length is exceeded or fallen below, the rotational speed and thus the circumferential speed of the first pair of rollers is readjusted in such a way that the setpoint length is reached again. The rotational speed and thus the circumferential speed of the second pair of rollers on the other hand is adjusted exclusively according to the momentary application speed which depends on the speed of the relative movement between the application tool and the glass pane.

The length of the strip in the compensating section can be determined in a very simple manner by means of at least one sensor that responds to the position of the strip, because the strip will move transversally in the compensating section, depending on excessive or insufficient delivery of the strip. Suitable sensors are known to the persons skilled in the art. For example, two sensors can be used in the form of two light barriers, of which the one determines the permissible maximum of the deviation of the strip from the stretched position and the other one the maximum approximation towards said stretched position.

Appropriately, the circumferential speed of the first pair of rollers is increased or decreased depending on the position of the strip in the compensating section as determined by means of the at least one sensor, so that the strip remains free from tensions in the compensating section, and at least close to a predetermined setpoint position.

Preferably, the strip is supported in the compensating section at least substantially in a slack-free fashion in order to prevent that the strip is subjected to an elongation under the influence of its own weight.

The strip can be guided and supported in the compensating section in an arc with a radius primarily dependent upon the difference between the circumferential speeds of the first and second pair of rollers. This can be achieved in particular by several guide rollers and pairs of guide rollers.

The strip is best supplied by means of an application head which can be turned about an axis that is orthogonal to the plane of the glass pane. The first pair of rollers and all subsequent strip transport and guide devices are arranged on the head. In fact, such turning application heads are generally known in connection with the application of plastic spacer frames. Although the elastoplastic strip can easily be turned according to the rotational movements of the application head about its longitudinal axis so that the strip transport and guide devices as proposed herein could also be arranged outside of the application head with the exception of the second pair of rollers, it is still better for the application head, despite the higher constructional complexity, to arrange the strip transport and guide devices on the same in order to ensure a tension-free supply of the strip to the application point.

Based on a known apparatus for the mechanical application of an elastoplastic spacer strip onto a glass pane, comprising the following features:

- a supporting wall for the glass pane which is slightly inclined towards the perpendicular;
- at least one horizontal conveyor in the zone of the bottom edge of the supporting wall;
- a pillar in a plane parallel to the supporting wall;
- an application head movable on the pillar between the bottom edge and the upper edge of the supporting wall, which head is turnable stepwise about an axis which is orthogonal to the plane of the supporting wall;
- devices for supplying the strip from a storage drum as well as for the pressing and dimensionally precise cutting of the strip;
- a machine control unit which measures, controls and monitors the movements of the parts of the apparatus and the transport of the strip;

the object on which the invention is based is achieved in such a way that

- the devices for supplying the strip comprise at least one first pair of rollers with a drive which can be regulated via the machine control unit, a compensating section with supporting rollers for the strip, a second pair of rollers with a drive which can be regulated via the machine control unit and at least one sensor for recognizing the position of the strip in the compensating section.

The storage drum should usually comprise a drive which can be regulated via the machine control unit.

A preferred embodiment of this apparatus is characterized in that the compensating section between the first and second pair of rollers comprises at least one slot-like guide means for the strip, with the long axis of the guide slot extending in a substantially orthogonal manner to the direction of the strip transport and the slot width being only slightly larger than the width of the strip.

Appropriately, a swivelable lever is arranged at the application point which supports the strip close to the application point especially during the turning of the application head.

BRIEF DESCRIPTION OF THE DRAWINGS

The invention is now explained in closer detail by reference to the enclosed drawings, wherein.

DETAILED DESCRIPTION

Figure 1:
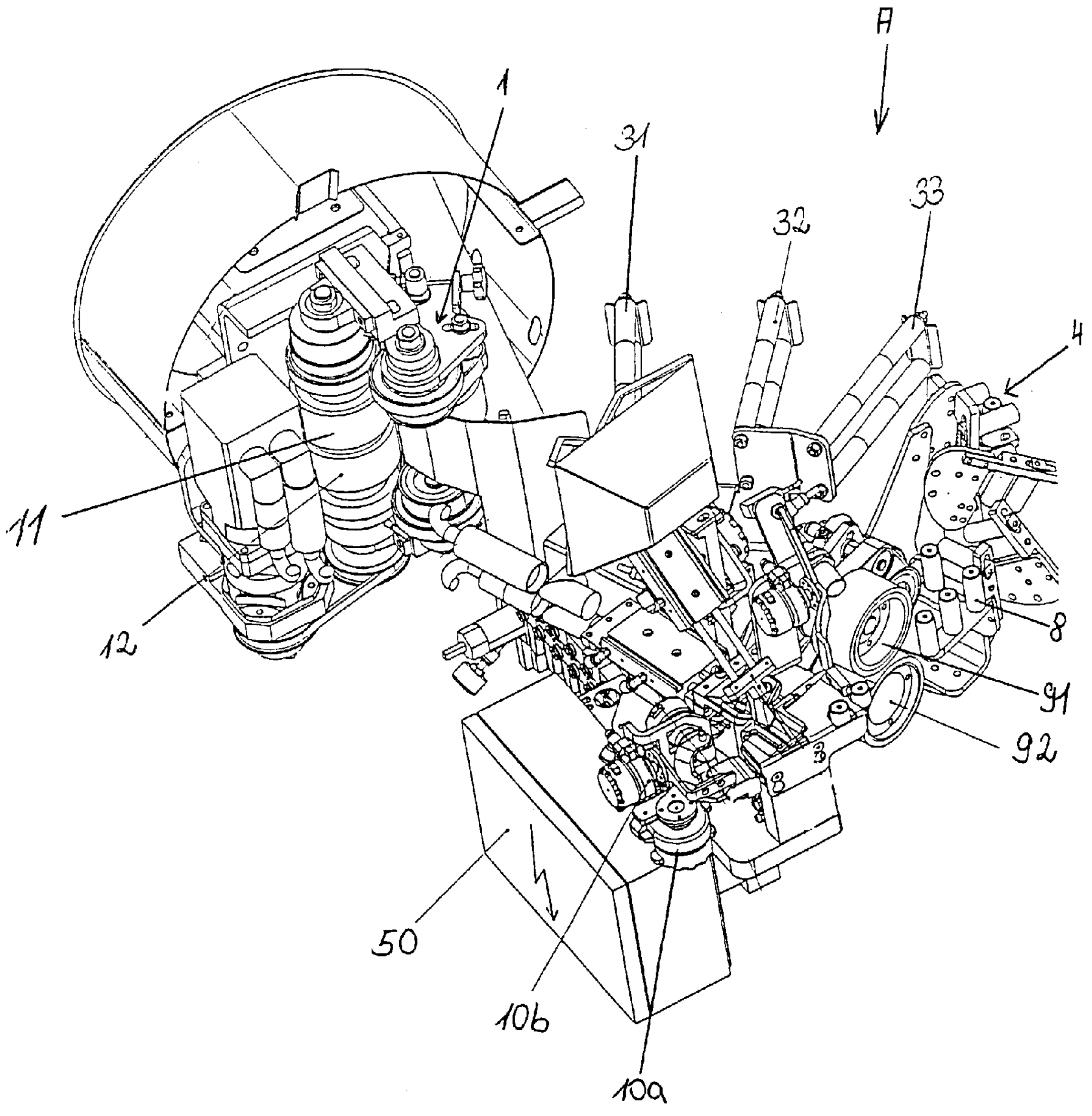
FIG. 1 shows a perspective view of an application head of an apparatus for applying an elastoplastic spacer strip.

The apparatus for the mechanical application of an elastoplastic spacer strip onto a glass pane according to the method as proposed herein comprises a supporting wall for the glass pane which is slightly inclined relative to the perpendicular, several separately controllable horizontal conveyors in the zone of the bottom edge of the supporting wall, a pillar which is parallel to the supporting wall at a distance from the same, and a carriage which can be moved up and down on the pillar and which carries an application head. All aforementioned parts are known, as also their sequences of movement. Apparatuses of this kind are used, among other things, to fill a sealing mass into the edge gaps between glass panes forming insulating glass units or to apply plastic spacers. The drawing therefore merely shows the special application head for applying an elastoplastic spacer strip.

Figure 3:
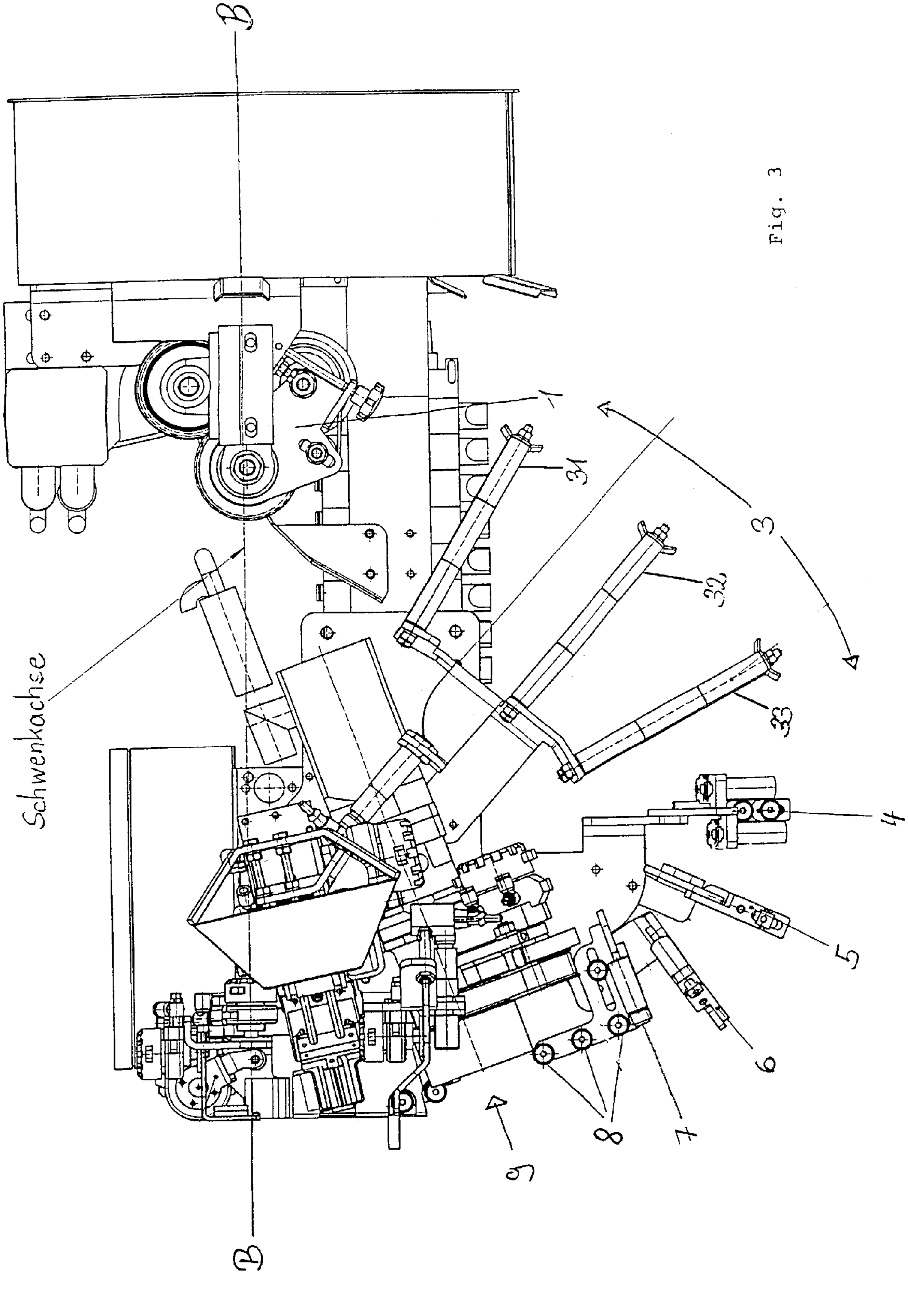
FIG. 3 shows a slightly simplified top view corresponding to FIG. 2.
Figure 4:
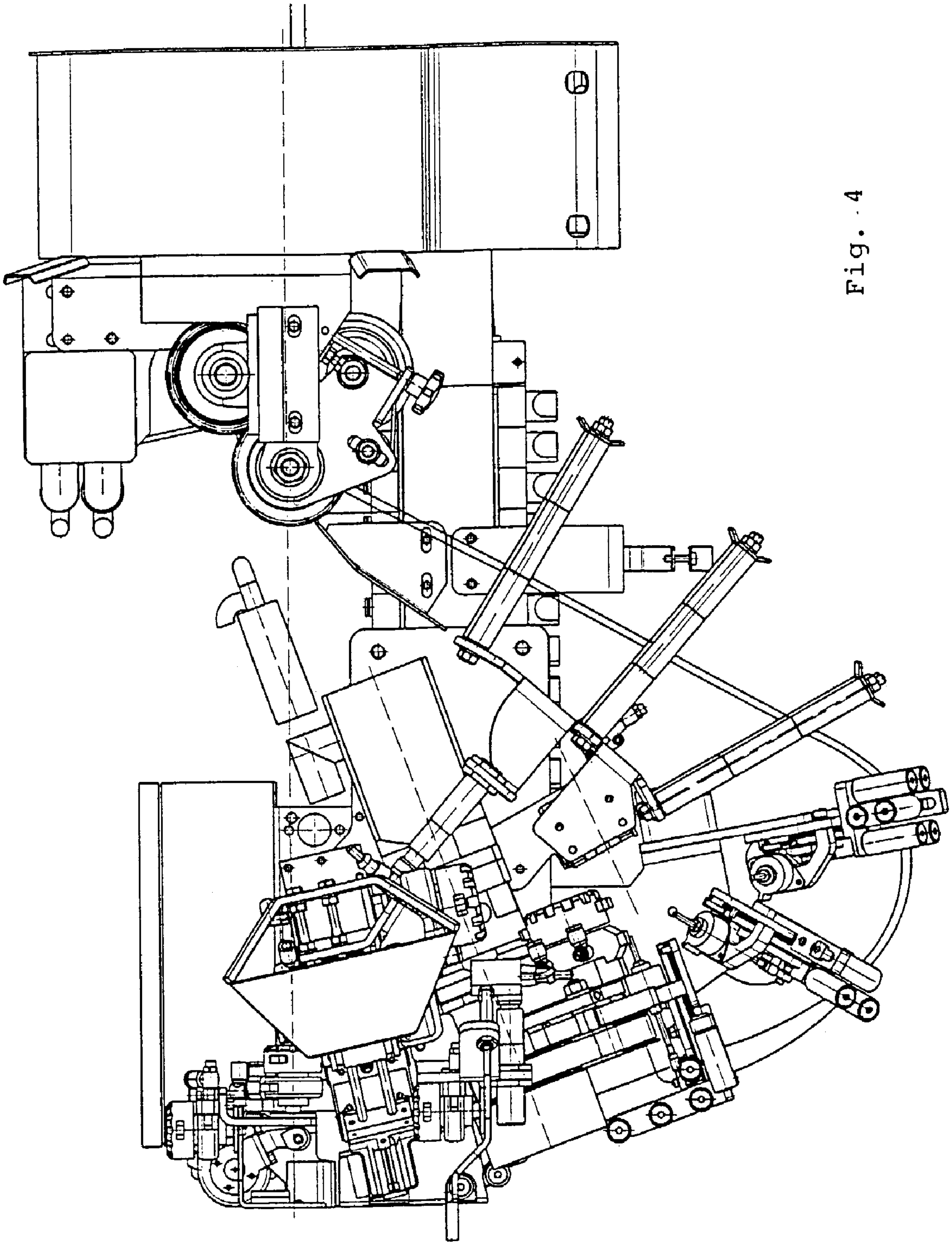
FIG. 4 shows an inclined view of the strip.

The application head, which can be turned stepwise for the purpose of moving over the usually four side edges of a glass pane in the known manner about axis B—B in FIG. 3, comprises in the direction of the strip transport from a storage drum (not shown) to the application point the following parts which are relevant to the function in the present context:

A first strip conveyor 1 is adjustably driven via the machine control unit 50 and two toothed belts 2, 2' (FIG. 2) and comprises four rollers 11, 12, 13, 14, of which the pairs of rollers 11 and 13 as well as 12 and 14 cooperate and are determined so as to be ideal for strips of different width. The strip conveyor 1 is supplied with the strip in a standing or upright fashion free from any tensions by the storage drum (not shown). For this purposes the storage drum is provided with an unwinding drive which is controlled via the machine control unit.

The strip conveyor 1 is followed by a compensating section 3 (FIG. 3) which is guided in an arc and in which the strip is guided between slot-like guide means consisting of three pairs of guide or supporting rollers 31, 32, 33 in such a way that it is able to yield transversally to its direction of conveyance, but not in the height plane.

The compensating section 3 ends at a strip guide means 4 which comprises six rollers, followed by three pairs of rollers 5, 6 and 7 which turn the strip by 90° to a "lying" orientation. Further rollers 8 assume the lateral guidance.

The strip then runs into a second strip conveyor 9 which comprises two mutually cooperating rollers 91 and 92 which are adjustably driven via a toothed belt 93 by the machine control unit.

Figure 2:
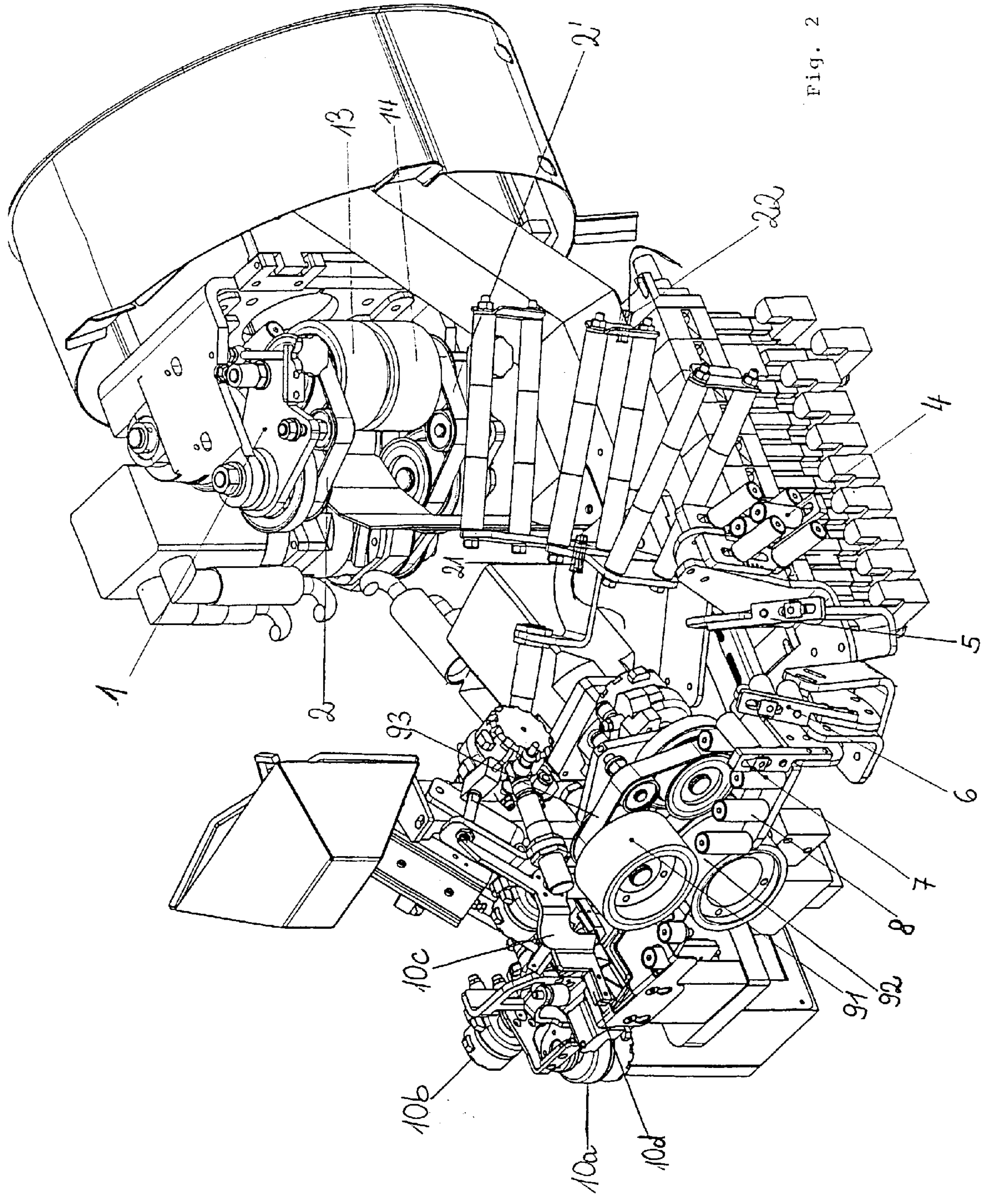
FIG. 2 shows the same application head as seen approximately from the direction “A” in FIG. 1.

The second strip conveyor 9 guides the strip to the actual application point. In addition to the usual press rollers 10*a* (for the horizontal leg of the later frame) and 10*b* (for the vertical legs of the later frame), it comprises the devices for punching out the miter wedges at the places at which the application head is turned for forming a corner, which devices are also usually present and are therefore not explained in closer detail. It also comprises a lever 10*c* with a strip support 10*d* (FIG. 2). The lever 10*c* is swivelable and supports the strip, especially when approaching a corner to be formed and/or before, during and after cutting the strip at the end of covering the shape of the glass pane for producing a closed spacer frame.

In the compensating section 3, namely at the narrow sides of the guide slot delimited by the pair of rollers 32, a first sensor 21 is situated at the inner side of the arc and a second sensor 22 is situated at the outer side of the arc. The sensors 21, 22, which may concern reflex light barriers for example, are connected with the machine control unit and emit a signal when the strip approaches. If the strip approaches sensor 21 due to an insufficient delivery by the strip conveyor 1 in relationship to the circumferential speed of the strip conveyor 9 as determined by the momentary application speed, the machine control unit will increase the drive speed slightly on the basis of this signal and thus the circumferential speed of the respective pair of rollers 11, 13 (or 12, 14) of the strip conveyor 1 and will thus prevent that a tensile stress is exerted on the strip. If conversely the strip approaches the sensor 22 on the outside of the strip due to an excessive delivery by the strip conveyor 1, the sensor emits the respective signal to the machine control unit which thereupon slightly reduces the circumferential speed of the respective pair of rollers of the strip conveyor 1 and thus prevents that the strip is compressed before the strip conveyor 9 and is applied in this state.

The invention claimed is:

1. A method for the mechanical application of an elasto-plastic strip as a spacer onto a glass pane which is intended for assembly with at least one further glass pane into an insulating glass unit, comprising:

unwinding of the strip in a manner free from tensile stresses from a storage drum with a linear speed corresponding at least on an average to the application speed; and delivering the strip to an application point in a manner free from tensile and shearing stresses, wherein the strip is supplied by means of a first driven pair of rollers of a compensating section to deliver the strip to the application point in a manner free from tensile and shearing stresses and is supplied to the application point at its end by means of a second pair of driven rollers;

a circumferential speed of the second pair of rollers is adjusted synchronously to an application speed; and the length of the strip in the compensating section between the first and second pair of rollers is determined and depending thereon the circumferential speed of the first pair of rollers is adjusted.

2. A method as claimed in claim 1, wherein the strip is supported in the compensating section at least substantially free from slack.

3. A method as claimed in claim 1, wherein the strip is guided and supported in the compensating section in an arc with a radius dependent upon the difference of the circumferential speeds of the first and second pair of rollers.

4. A method as claimed in claim 1, wherein the strip is supplied by means of an application head which can be turned about an axis which is orthogonal to the plane of the glass pane and on which the first pair of rollers and all subsequent strip conveyor and strip guide devices are arranged.

5. A method as claimed in claim 1, wherein the length of strip in the compensating section is determined by means of at least one sensor responding to the position of the strip.

6. A method as claimed in claim 5, wherein the circumferential speed of the first pair of rollers is increased or decreased depending on the position of the strip in the compensating section as determined by means of the at least one sensor, so that the strip remains free from tensions in the compensating section at least close to a predetermined setpoint position.

* * * * *

UNITED STATES PATENT AND TRADEMARK OFFICE

CERTIFICATE OF CORRECTION

PATENT NO. : 7,008,492 B2
APPLICATION NO. : 10/390754
DATED : March 7, 2006
INVENTOR(S) : Peter Lisec It is certified that error appears in the above-identified patent and that said Letters Patent is hereby corrected as shown below:

On the Title Page of the patent, in Item (63), "Continuation of application No. PCT/IB04/002206, filed on Jul. 1, 2004." should be deleted.

Signed and Sealed this

Sixteenth Day of March, 2010

David J. Kappos
*Director of the United States Patent and Trademark Office*